US012807320B2

(12) United States Patent
Crebassol et al.

(10) Patent No.: US 12,807,320 B2
(45) Date of Patent: Nov. 24, 2026

(54) ACOUSTIC ATTENUATION PANEL COMPRISING AN INDUCTION-BASED FROST TREATMENT SYSTEM, AIR INTAKE OF AN AIRCRAFT NACELLE AND AIRCRAFT COMPRISING SUCH A PANEL

(71) Applicant: Airbus Operations SAS, Toulouse (FR)

(72) Inventors: Florent Crebassol, Toulouse (FR); Grégoire Smith, Toulouse (FR); Florent Huet, Toulouse (FR); François Pons, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 218 days.

(21) Appl. No.: 18/742,140

(22) Filed: Jun. 13, 2024

(65) Prior Publication Data

US 2025/0002168 A1 Jan. 2, 2025

(30) Foreign Application Priority Data

Jun. 28, 2023 (FR) ........................................ 2306751

(51) Int. Cl.
*B64D 33/02* (2006.01)
*B64D 45/02* (2006.01)

(52) U.S. Cl.
CPC ...... *B64D 33/02* (2013.01); *B64D 2033/0206* (2013.01); *B64D 2033/0233* (2013.01); *B64D 45/02* (2013.01)

(58) Field of Classification Search
CPC ............ B64D 33/02; B64D 2033/0233; B64D 2033/0206; B64D 45/02
USPC .......................................................... 181/214
See application file for complete search history.

(56) References Cited

U.S. PATENT DOCUMENTS

| | | | | |
|---|---|---|---|---|
| 11,685,507 B2 * | 6/2023 | Porte | B64C 1/40 | 181/214 |
| 2011/0049300 A1 * | 3/2011 | Safai | B64D 15/12 | 244/134 D |
| 2013/0098471 A1 * | 4/2013 | Porte | B64D 33/02 | 137/15.1 |

(Continued)

FOREIGN PATENT DOCUMENTS

| | | | | |
|---|---|---|---|---|
| DE | 102007026246 B4 | 12/2009 | | |
| EP | 3135587 A1 | 3/2017 | | |
| WO | WO-2008059169 A2 * | 5/2008 | | F02C 7/047 |

OTHER PUBLICATIONS

French Search Report for corresponding French Patent Application No. 2306751 dated Nov. 24, 2023.

*Primary Examiner* — Forrest M Phillips
(74) *Attorney, Agent, or Firm* — Greer, Burns & Crain, Ltd.

(57) ABSTRACT

An acoustic attenuation panel comprising, from a first face to an opposite second face, an acoustically resistive structure, at least one cellular structure and a reflective layer. This acoustic attenuation panel comprises an induction-based frost treatment system which comprises at least one electromagnetic field generator positioned at the reflective layer and at least one electrically conductive element situated at the first face of the acoustic attenuation panel and configured to generate a heating through an induction phenomenon. Also an aircraft and an air intake of an aircraft nacelle comprising at least one such panel.

16 Claims, 3 Drawing Sheets

(56) References Cited

U.S. PATENT DOCUMENTS

| | | | |
|---|---|---|---|
| 2017/0057618 A1 | 3/2017 | Khozikov et al. | |
| 2017/0361938 A1* | 12/2017 | Hull | B64D 15/22 |
| 2020/0070949 A1* | 3/2020 | Porte | B64C 1/40 |

* cited by examiner

ACOUSTIC ATTENUATION PANEL COMPRISING AN INDUCTION-BASED FROST TREATMENT SYSTEM, AIR INTAKE OF AN AIRCRAFT NACELLE AND AIRCRAFT COMPRISING SUCH A PANEL

CROSS-REFERENCES TO RELATED APPLICATIONS

This application claims the benefit of French Patent Application Number 2306751 filed on Jun. 28, 2023, the entire disclosure of which is incorporated herein by way of reference.

FIELD OF THE INVENTION

The present application relates to an acoustic attenuation panel comprising an induction-based frost treatment system, to an air intake of an aircraft nacelle comprising at least one such acoustic attenuation panel and to an aircraft comprising at least one such acoustic attenuation panel.

BACKGROUND OF THE INVENTION

According to an embodiment visible in FIG. 1, an aircraft 10 comprises a fuselage 12, wings 14 positioned on either side of the fuselage 12 and propulsion assemblies 16 positioned under the wings 14 and linked thereto by pylons 18. As illustrated in FIG. 2, each propulsion assembly 16 comprises an engine system 20 and a nacelle 22 positioned around the engine system 20.

The engine system 20 has an axis of rotation A20. For the present application, a longitudinal direction is parallel to the axis of rotation A20 of the engine system 20. A longitudinal plane contains the axis of rotation A20 of the engine system 20. A transverse plane is at right angles to the axis of rotation A20 of the engine system 20.

The nacelle 22 comprises, at the front, an air intake 24 configured to channel an air stream towards the engine system 20 and notably a fan 20.1 of the engine system 20. As illustrated in FIGS. 2 and 3, the air intake 24 comprises a lip 26 which forms a circular leading edge, an outer wall 28 extending the lip 26 towards the outside of the nacelle 22 and an inner duct 30 extending the lip 26 towards the inside of the nacelle 22. This inner duct 30 comprises a rear edge 30.1 linked to a fan casing 32 positioned around the fan of the engine system. According to one configuration, the inner duct 30 and the fan casing 32 each comprise at least one acoustic attenuation panel 34 configured to attenuate at least one acoustic wave. As is known, an acoustic attenuation panel 34 comprises an acoustically resistive layer 34.1 in contact with an air stream, at least one cellular structure 34.2 and a reflective layer 34.3. This acoustic attenuation panel 34 operates according to the principle of a Helmholtz resonator, the acoustically resistive layer 34.1 being porous to at least some acoustic waves to be attenuated which penetrate into the cells of the cellular structure 34.2 to be attenuated therein, the reflective layer 34.3 being impermeable to the acoustic waves.

Depending on the climatic conditions and the flight phases, the air intake 24 is a zone that lends itself to the formation and/or to the build-up of frost and/or of ice. To limit the appearance and/or the build-up of the frost and/or ice at the lip 26 and possibly the inner duct 30, these zones include a frost treatment system. According to one embodiment, the frost treatment system is of electric type and comprises at least one resistive mat pressed against the inner face of the wall to be treated and covering all the zone to be treated, as well as a current generator linked to the resistive mat. In circulating in the resistive mat, the electric current generates a heating by Joules effect.

According to a first embodiment, so as not to disrupt the operation of the acoustic panel, the resistive mat is positioned against the reflective layer 34.3. To allow the propagation of the heat from the reflective layer 34.3 to the outer face (in contact with the air stream) of the acoustically resistive layer 34.1, all the elements that make up the acoustic attenuation panel 34 must be made of a thermally conductive material such as metal for example, which tends to significantly increase the weight of the acoustic attenuation panel 34 which is usually made of composite material if it does not incorporate the frost treatment function.

According to a second embodiment, the resistive mat is positioned against the inner face of the acoustically resistive layer 34.1. Unlike in the first embodiment, the cellular structure 34.2 and the reflective layer 34.3 can be made of a thermally non-conductive material. According to this second embodiment, the zones of the acoustically resistive layer 34.1 situated in line with the resistive mats are not perforated or, if they are, the operation of the acoustic panel is greatly disrupted in line with the resistive mats. Consequently, the presence of these resistive mats at the acoustically resistive layer 34.1 affects the acoustic treatment.

SUMMARY OF THE INVENTION

The present invention aims to overcome all or some of the drawbacks of the prior art.

To this end, a subject of the invention is an acoustic attenuation panel having a first face, configured to be in contact with an air stream in which at least one acoustic wave is propagated in operation, and a second face opposite the first face, said acoustic attenuation panel comprising at least one frost treatment system and, from the first face to the second face, an acoustically resistive structure of which one surface forms the first face, at least one cellular structure and a reflective layer of which one surface forms the second face.

According to the invention, the frost treatment system comprises at least one first, induction-based, frost treatment system and at least one second frost treatment system of mechanical type configured to generate mechanical vibrations, the first, induction-based, frost treatment system comprising at least one electromagnetic field generator positioned at the second face of the acoustic attenuation panel and several electrically conductive elements incorporated in the acoustically resistive structure, in the form of strips of electrically conductive material spaced apart from one another and configured to generate a heating through an induction phenomenon, the second frost treatment system of mechanical type comprising at least one vibration source inserted between two strips of electrically conductive material of the first, induction-based, frost treatment system.

This solution makes it possible to obtain a frost treatment that is effective for an acoustic attenuation panel regardless of the material (metal or composite material) of the different parts of the acoustic attenuation panel. Furthermore, this solution makes it possible to space apart the strips of electrically conductive material and reduce the electrical consumption of the frost treatment system, the first, induction-based, frost treatment system being more energy-intensive than the second frost treatment system of mechanical type.

According to another feature, the frost treatment system comprises several electromagnetic field generators distributed on the second face of the acoustic attenuation panel.

According to another feature, each electromagnetic field generator is fixed against the reflective layer.

According to another feature, each electromagnetic field generator is an electric coil.

According to another feature, the strips of electrically conductive material are oriented in two secant directions.

Another subject of the invention is an aircraft and an air intake of an aircraft nacelle comprising at least one acoustic attenuation panel according to one of the preceding features.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

Figure 1:
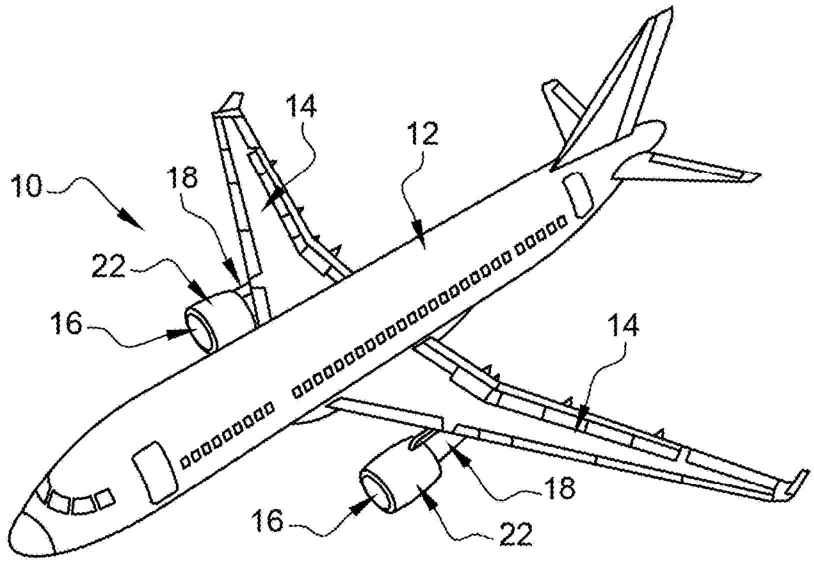
FIG. 1 is a perspective view of an aircraft.
Figure 2:
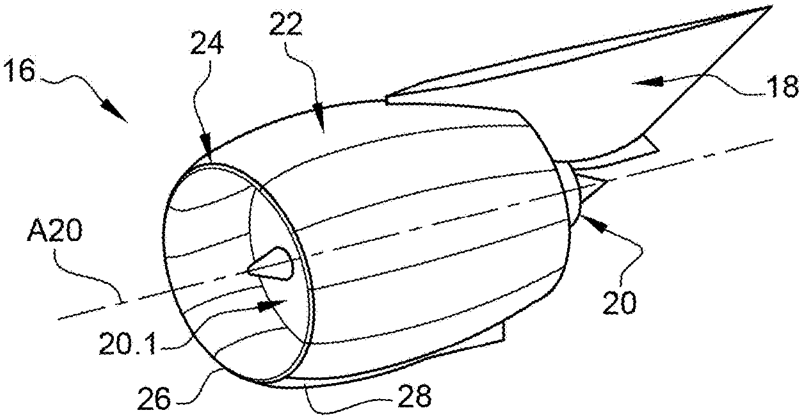
FIG. 2 is a perspective view of a propulsion assembly of an aircraft.
Figure 3:
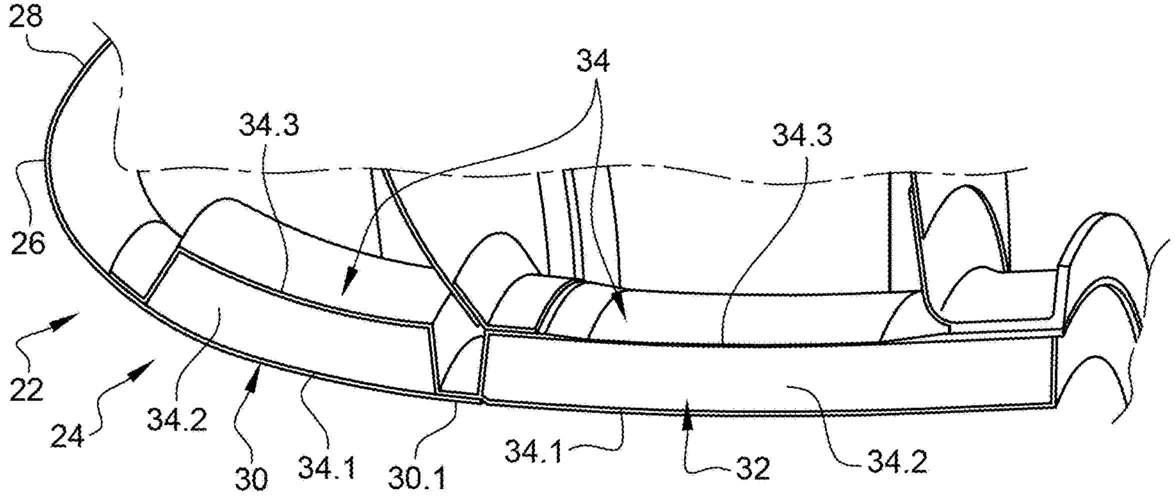
FIG. 3 is a longitudinal cross-section of a part of a propulsion assembly of an aircraft.
Figure 4:
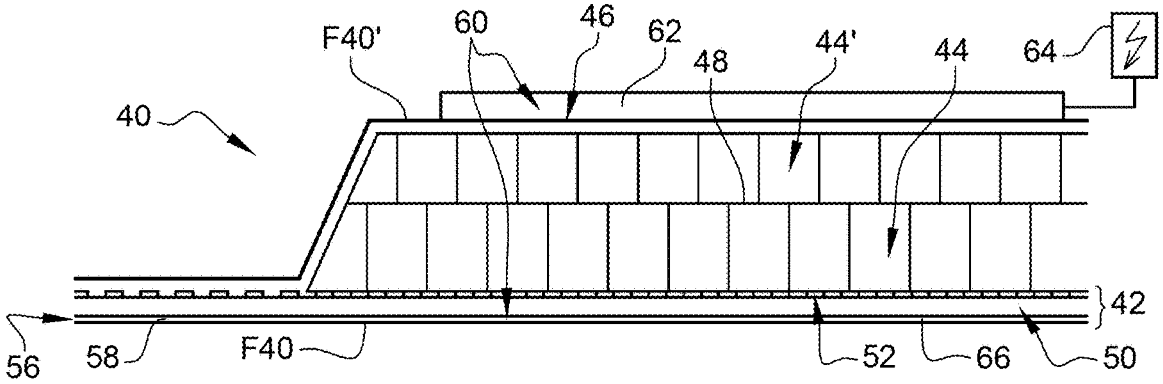
FIG. 4 is a longitudinal cross-section of a part of an acoustic attenuation panel illustrating an embodiment of the invention.
Figure 6:
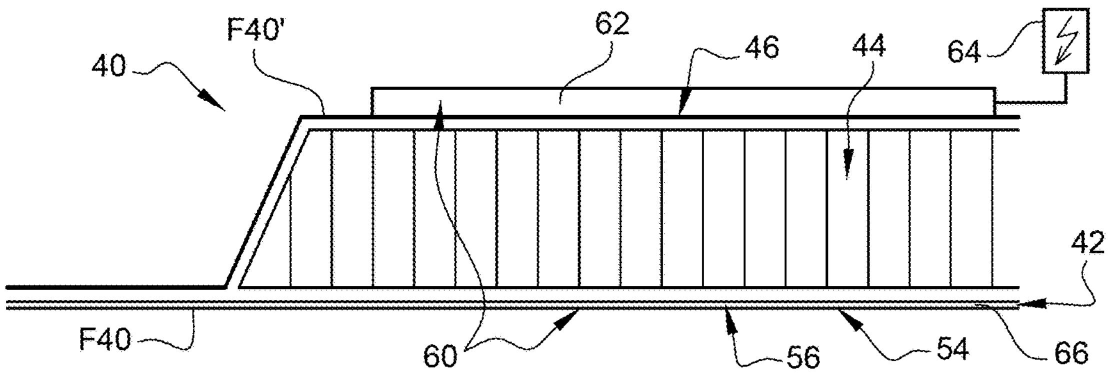
FIG. 6 is a longitudinal cross-section of a part of an acoustic attenuation panel illustrating another embodiment of the invention.

According to the embodiments visible in FIGS. 4 and 6, an acoustic attenuation panel 40 has a first face F40 in contact with an air stream in which at least one acoustic wave is propagated and a second face F40' opposite the first face F40.

According to one application, an air intake of an aircraft nacelle comprises at least one acoustic attenuation panel 40 positioned at the lip and/or the inner duct of the air intake.

Obviously, the invention is not limited to this application. Thus, the acoustic attenuation panel 40 could be situated in other zones of an aircraft.

According to the embodiments visible in FIGS. 4 and 6, the acoustic attenuation panel comprises, from the first face F40 to the second face F40', an acoustically resistive structure 42 of which one surface forms the first face F40, at least one cellular structure 44 and a reflective layer 46 of which one surface forms the second face F40'. The acoustically resistive structure 42 is permeable to at least some sound waves to be attenuated.

The reflective layer 46 comprises at least one thin plate, made of metal or of composite material, that is impermeable to the sound waves.

According to an embodiment visible in FIG. 4, the acoustic attenuation panel 40 comprises two cellular structures 44, 44' that are superposed and separated by an acoustically resistive layer 48 that is permeable to the sound waves.

According to another embodiment visible in FIG. 6, the acoustic attenuation panel 40 comprises a single cellular structure 44.

According to one embodiment, each cellular structure is made of composite material.

The number of cellular structures 44, 44' and their characteristics are determined as a function of the acoustic characteristics sought for the acoustic attenuation panel 40.

According to an embodiment visible in FIG. 4, the acoustically resistive structure 42 comprises at least one porous layer 50 made of composite material that is passed through by orifices. The number of orifices, their section and their arrangement are determined as a function of the acoustic characteristics sought for the acoustic attenuation panel 40. In addition, the acoustically resistive structure 42 can comprise at least one winding 52 made of composite material. According to one arrangement, this winding 52 is positioned between the cellular structure 44 and the porous layer 50.

Figure 7:
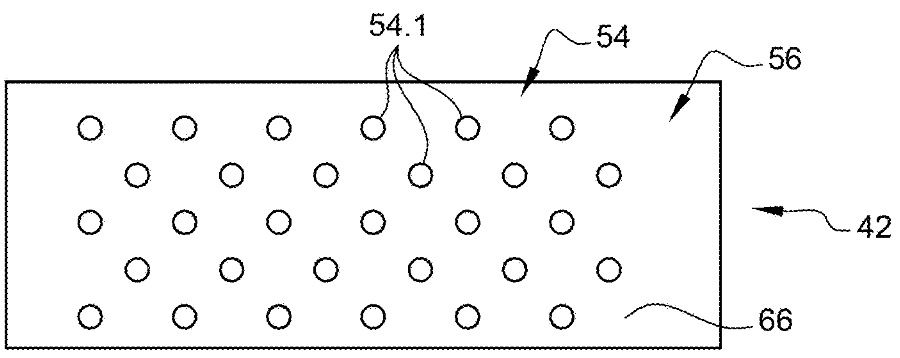
FIG. 7 is a front view of an acoustically resistive structure of an acoustic attenuation panel.

According to another embodiment visible in FIGS. 6 and 7, the acoustically resistive structure 42 comprises at least one metal layer 54 passed through by orifices 54.1. The number of orifices, their section and their arrangement are determined as a function of the acoustic characteristics sought for the acoustic attenuation panel 40.

According to one configuration, the acoustically resistive structure 42 comprises a lightning protection system 56 made of an electrically conductive material at least partially covering the first face F40. According to one arrangement, the lightning protection system 56 covers all of the first face F40.

This lightning protection system 56 comprises at least one metal layer 54, 58 positioned at the acoustically resistive structure 42.

According to an embodiment visible in FIG. 6, when the acoustically resistive structure 42 comprises a metal layer 54 for the acoustic function, the latter can ensure the lightning protection function. According to this embodiment, the acoustically resistive structure 42 does not comprise a metal layer exclusively dedicated to the lightning protection system 56 but one metal layer 54 ensuring the acoustic and lightning protection functions.

According to an embodiment visible in FIG. 4, the acoustically resistive structure 42 comprises only layers made of composite material for the acoustic function. In addition, this acoustically resistive structure 42 comprises a metal layer 58 dedicated to the lightning protection function. This metal layer 58 of the lightning protection system 56 is positioned at the first face F40. According to one configuration, this metal layer 58 takes the form of a lattice or a grating made of metal, such as an alloy of copper for example.

In both cases, the metal layers 54, 58 are produced in an electrically conductive material.

According to a particular feature of the invention, the acoustic attenuation panel 40 comprises at least one frost treatment system 60 configured to generate a heating at the first face F40. Frost treatment is understood to mean an anti-frosting treatment preventing the formation of ice or of frost on the first face F40 or a defrosting treatment aiming to at least partially remove the frost or the ice formed on the first face F40.

This frost treatment system 60 comprises at least one electromagnetic field generator 62, positioned at the second face F40' and powered by at least one electrical power supply 64, and at least one electrically conductive element 66 situated at the first face F40 of the acoustic attenuation panel 40, positioned in the electromagnetic field produced by the electromagnetic field generator 62 and configured to generate a heating through an induction phenomenon. Each electrically conductive element 66 is configured to limit its impact on the acoustic treatment. This solution makes it possible to obtain a frost treatment that is effective for an acoustic attenuation panel 40 essentially made of composite material (apart from the electrically conductive element or elements of the frost treatment system 60).

According to a first arrangement, the electromagnetic field generator 62 is incorporated in the acoustic attenuation panel 40 by being fixed against the reflective layer 46. According to a second arrangement, the electromagnetic field generator 62 is an element separated from the reflective layer 46, positioned in proximity thereto.

According to one embodiment, the electromagnetic field generator 62 is configured to be in an activated state in which it generates an electromagnetic field provoking, through an induction phenomenon, a heating of each electrically conductive element 66 positioned in the electromagnetic field produced by the electromagnetic field generator 62 and a deactivated state in which it does not generate any electromagnetic field and does not provoke a heating of the electrically conductive elements 66. In addition, the frost treatment system 60 comprises at least one control for controlling the activated or deactivated state of the electromagnetic field generator 62.

According to one configuration, the frost treatment system 60 comprises several electromagnetic field generators 62 distributed over the entire second face F40' of the acoustic attenuation panel 40. Each electromagnetic field generator 62 can interact with one electrically conductive element 66 or several electrically conductive elements 66.

According to one embodiment, each electromagnetic field generator 62 is an electric coil.

The electrically conductive element 66 and the metal layer 58 of the lightning protection system 56 in metal lattice or grating form could form just one element. According to this configuration, the layer ensures the lightning protection and frost treatment functions.

The electrically conductive element 66 of the frost treatment system 60 and the metal layer 54 of the acoustically resistive structure 42 could form just one single element which ensures the acoustic, lightning protection and frost treatment functions.

Figure 5:
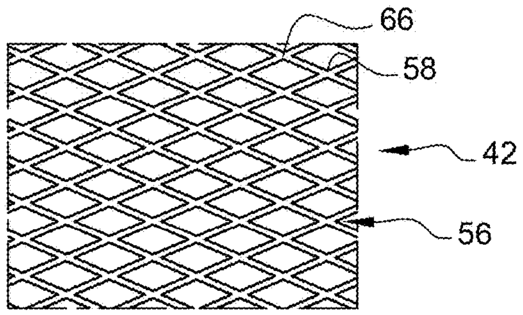
FIG. 5 is a front view of a lightning protection layer of an acoustic attenuation panel.

The configurations visible in FIGS. 5 and 6 make it possible to use as electrically conductive element 66 an element already present in the acoustically resistive structure 42, ensuring a function other than that of frost treatment.

Figure 8:
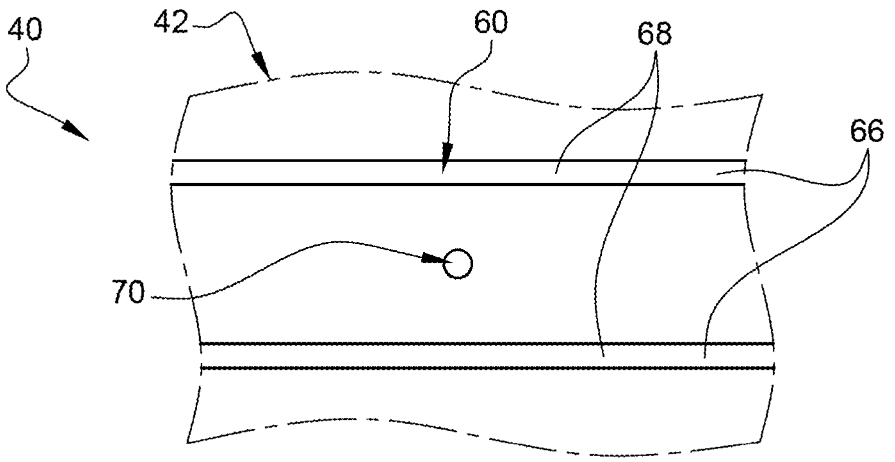
FIG. 8 is a schematic top view of a frost treatment system of an acoustic attenuation panel illustrating an embodiment of the invention.

According to a feature of the invention visible in FIGS. 7 and 8, the frost treatment system 60 comprises several electrically conductive elements 66, incorporated in the acoustically resistive structure 42, in the form of strips of electrically conductive material 68. According to this configuration, the electrically conductive elements can have only a single frost treatment function.

According to a first arrangement visible in FIG. 8, the strips of electrically conductive material 68 are parallel to one another and oriented in a single direction.

Figure 9:
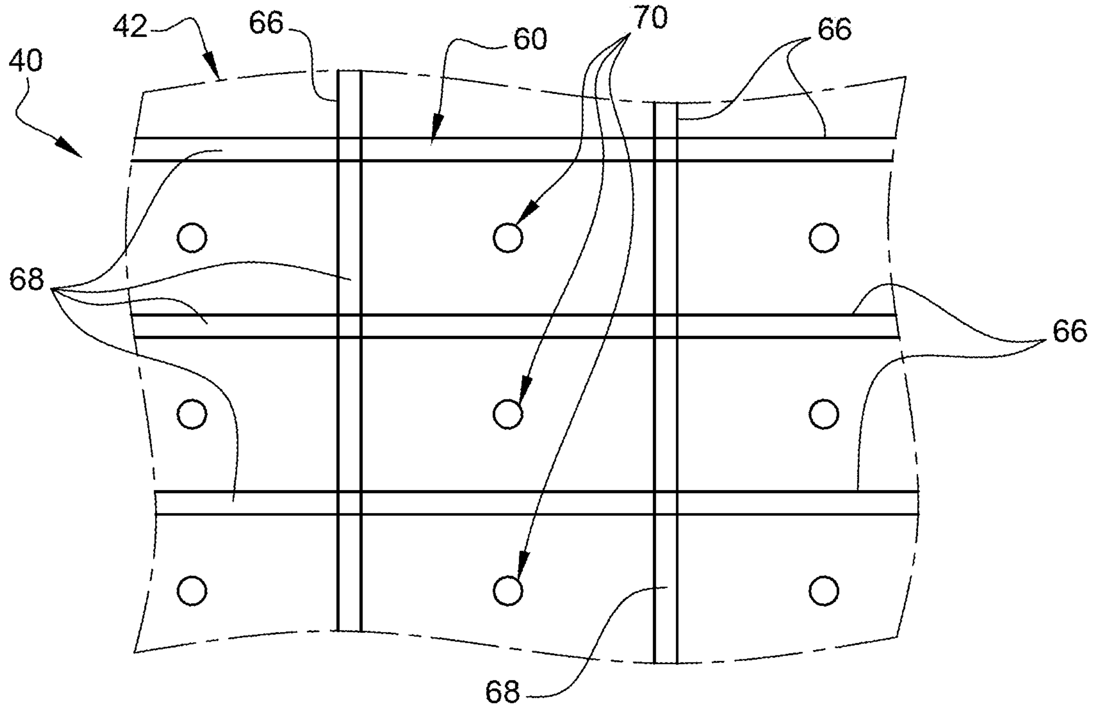
FIG. 9 is a schematic top view of a frost treatment system of an acoustic attenuation panel illustrating another embodiment of the invention.

According to another arrangement visible in FIG. 9, the strips of electrically conductive material 68 are oriented in two secant directions, notably at right angles.

According to an embodiment visible in FIG. 9, the acoustic attenuation panel 40 comprises at least one first, induction-based, frost treatment system 60, as previously described, and at least one second frost treatment system of mechanical type 70 configured to generate mechanical vibrations such as piezoelectric elements for example. According to one configuration, the second frost treatment system of mechanical type 70 comprises at least one vibration source inserted between two strips of electrically conductive material 68 of the first, induction-based, frost treatment system 60. This solution makes it possible to space apart the strips of electrically conductive material 68 and reduce the electrical consumption of the frost treatment system 60, the first, induction-based, frost treatment system being more energy-intensive than the second frost treatment system of mechanical type 70.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic attenuation panel comprising:

a first face, configured to be in contact with an air stream in which at least one acoustic wave is propagated in operation, a second face opposite the first face, at least one frost treatment system, and, from the first face to the second face, an acoustically resistive structure of which one surface forms the first face, at least one cellular structure and a reflective layer of which one surface forms the second face, wherein the at least one frost treatment system comprises at least one first, induction-based, frost treatment system and at least one second frost treatment system of mechanical type configured to generate mechanical vibrations, the first, induction-based, frost treatment system comprising at least one electromagnetic field generator positioned at the second face of the acoustic attenuation panel, wherein the at least one frost treatment system comprises several electromagnetic field generators distributed over the entire second face of the acoustic attenuation panel, and wherein each electromagnetic field generator is fixed against the reflective layer, and several electrically conductive elements incorporated in the acoustically resistive structure, the electrically conductive elements being in a form of strips of electrically conductive material spaced apart from one another and configured to generate a heating through an induction phenomenon, and the at least one second frost treatment system of mechanical type comprising at least one vibration source interposed between two adjacent strips of electrically conductive material of the first, induction-based, frost treatment system, wherein the vibration source comprises at least one piezoelectric element.

2. The acoustic attenuation panel according to claim 1, wherein each electromagnetic field generator is an electric coil.

3. The acoustic attenuation panel according to claim 1, wherein the strips of electrically conductive material are oriented in two secant directions which are at right angles.

4. An air intake of an aircraft nacelle comprising:

the acoustic attenuation panel according to claim 1.

5. An aircraft comprising:

the acoustic attenuation panel according to claim 1.

6. The acoustic attenuation panel according to claim 1, wherein the electromagnetic field generator is configured to have an activated state in which it generates an electromagnetic field provoking, through an induction phenomenon, heating of each electrically conductive element positioned within the electromagnetic field, and a deactivated state in which it does not generate any electromagnetic field and does not provoke heating of the electrically conductive elements.

7. The acoustic attenuation panel according to claim 6, wherein the frost treatment system comprises at least one control for controlling the activated or deactivated state of the electromagnetic field generator.

8. The acoustic attenuation panel according to claim 1, wherein the electromagnetic field generator is separated from the reflective layer and positioned in proximity thereto.

9. The acoustic attenuation panel according to claim 1, wherein the strips of electrically conductive material are parallel to one another and oriented in a single direction.

10. The acoustic attenuation panel according to claim 1, wherein the frost treatment system is configured to space apart the strips of electrically conductive material and reduce electrical consumption of the frost treatment system.

11. The acoustic attenuation panel according to claim 1, wherein the acoustic attenuation panel comprises two cellular structures that are superposed and separated by an acoustically resistive layer that is permeable to sound waves.

12. The acoustic attenuation panel according to claim 1, wherein the acoustically resistive structure comprises a porous layer made of composite material that is passed through by orifices, and wherein the acoustically resistive structure comprises a winding made of composite material positioned between the cellular structure and the porous layer.

13. The acoustic attenuation panel according to claim 1, wherein the acoustically resistive structure comprises a lightning protection system made of an electrically conductive material at least partially covering the first face.

14. The acoustic attenuation panel according to claim 13, wherein the lightning protection system covers all of the first face.

15. The acoustic attenuation panel according to claim 13, wherein the lightning protection system comprises a metal layer positioned at the acoustically resistive structure.

16. The acoustic attenuation panel according to claim 1, wherein the electrically conductive element and a metal layer of a lightning protection system form just one element, and wherein the layer ensures lightning protection and frost treatment functions.

* * * * *